United States Patent
Sherwood et al.

(10) Patent No.: US 10,266,707 B2
(45) Date of Patent: Apr. 23, 2019

(54) SCRATCH AND ABRASION RESISTANT UV BLOCKING GLASS COATING

(71) Applicant: Tru Vue, Inc., Faribault, MN (US)

(72) Inventors: Philip William Sherwood, Milford, CT (US); Vinod Kanniah, Woodridge, IL (US); Jean Dee Breshears, Lockport, IL (US)

(73) Assignee: TRU VUE, INC., Faribault, MN (US)

( * ) Notice: Subject to any disclaimer, the term of this patent is extended or adjusted under 35 U.S.C. 154(b) by 0 days.

(21) Appl. No.: 15/227,461

(22) Filed: Aug. 3, 2016

(65) Prior Publication Data

US 2016/0340523 A1 Nov. 24, 2016

Related U.S. Application Data

(60) Division of application No. 14/466,727, filed on Aug. 22, 2014, now abandoned, which is a
(Continued)

(51) Int. Cl.
*C09D 5/32* (2006.01)
*C08K 5/05* (2006.01)
(Continued)

(52) U.S. Cl.
CPC ............ *C09D 5/32* (2013.01); *C03C 17/007* (2013.01); *C03C 17/009* (2013.01); *C08K 3/36* (2013.01); *C08K 5/005* (2013.01); *C08K 5/05* (2013.01); *C08K 5/07* (2013.01); *C08K 5/132* (2013.01); *C08K 5/5419* (2013.01); *C08L 83/00* (2013.01); *C08L 83/02* (2013.01); *C09D 1/00* (2013.01); *C09D 7/63* (2018.01); *C09D 183/02* (2013.01); *C09D 183/06* (2013.01); *C09D 183/08* (2013.01); *G02B 1/14* (2015.01); *G02B 5/208* (2013.01); *C03C 2217/44* (2013.01);
(Continued)

(58) Field of Classification Search
CPC ........................................................ C09D 5/32
See application file for complete search history.

(56) References Cited

U.S. PATENT DOCUMENTS 4,122,233 A 10/1978 Proskow et al.
4,495,360 A 1/1985 Anthony et al.
(Continued)

FOREIGN PATENT DOCUMENTS

WO 2014133748 A1 9/2014

OTHER PUBLICATIONS

Nemeth et al., "Mechanical properties of hybrid sol-gel derived films as a function of cmnposition and thermal treatment," 2009, Thin Solid Films 517, pp. 4888-4891. (Year: 2009).*
(Continued)

*Primary Examiner* — Robert A Vetere
(74) *Attorney, Agent, or Firm* — Dorsey & Whitney LLP (57) ABSTRACT

A coating composition and method of making a scratch resistant UV blocking glass coating is described. The composition can include an aqueous colloidal silica. a bifunctional silanol coupling agent, tetraethylorthosilicate (TEOS), a UV absorber, and a water miscible solvent selected from glycol ethers, alkanols, keto alcohols, and combinations thereof. The molar ratio of the bi-functional silanol to TEOS is selected to provide scratch resistance coupled with water resistance.

10 Claims, 2 Drawing Sheets

Related U.S. Application Data continuation-in-part of application No. 13/779,029, filed on Feb. 27, 2013, now Pat. No. 9,255,213, which is a continuation-in-part of application No. PCT/US2014/015743, filed on Feb. 11, 2014.

(51) Int. Cl.

| | | |
|---|---|---|
| C08K 5/07 | (2006.01) | |
| C09D 183/02 | (2006.01) | |
| C09D 183/06 | (2006.01) | |
| C03C 17/00 | (2006.01) | |
| C08K 3/36 | (2006.01) | |
| C08K 5/00 | (2006.01) | |
| C08K 5/132 | (2006.01) | |
| C08K 5/5419 | (2006.01) | |
| C09D 183/08 | (2006.01) | |
| G02B 1/14 | (2015.01) | |
| C09D 1/00 | (2006.01) | |
| G02B 5/20 | (2006.01) | |
| C08L 83/00 | (2006.01) | |
| C08L 83/02 | (2006.01) | |
| C09D 7/63 | (2018.01) | |
| C08G 77/14 | (2006.01) | |
| C08G 77/26 | (2006.01) | |

(52) U.S. Cl.
CPC .. *C03C 2217/478* (2013.01); *C03C 2217/485* (2013.01); *C03C 2217/74* (2013.01); *C03C 2217/78* (2013.01); *C03C 2218/118* (2013.01); *C08G 77/14* (2013.01); *C08G 77/26* (2013.01); *Y10T 428/31612* (2015.04)

(56) References Cited

U.S. PATENT DOCUMENTS

| | | |
|---|---|---|
| 5,371,138 A | 12/1994 | Ganbarg et al. |
| 6,001,163 A | 12/1999 | Havey et al. |
| 6,649,212 B2 | 11/2003 | Payne et al. |
| 9,255,213 B2 | 2/2016 | Breshears et al. |
| 2001/0041766 A1* | 11/2001 | Wielstra ............... C08G 77/08 524/512 |
| 2002/0030181 A1 | 3/2002 | Stroud et al. |
| 2003/0111159 A1* | 6/2003 | Hashimoto ....... B32B 17/10018 156/99 |
| 2009/0004482 A1 | 1/2009 | Sharma et al. |
| 2009/0148711 A1 | 6/2009 | Le Blanc et al. |
| 2010/0019399 A1* | 1/2010 | Kimura ................ C08F 283/12 257/791 |
| 2011/0020604 A1* | 1/2011 | Zheng .................... B82Y 30/00 428/148 |
| 2011/0034620 A1 | 2/2011 | Higuchi et al. |
| 2014/0363683 A1 | 12/2014 | Sherwood et al. |

OTHER PUBLICATIONS

Arfsten et al., 2005, "Abrasion Resistant Coatings with Ultraviolet Absorption, via sol-gel dipping method," Mater. Res. Soc. Symp. Proc. vol. 847, pp. 13.44.1-9 (Year: 2005).*

European Search Report for European Patent Application No. 15180867.0, dated Mar. 3, 2016 (12 pages).

International Search Report for International Application No. PCT/US2014/015743, dated May 20, 2014 (3 pages).

Written Opinion of the International Searching Authority for International Patent Application No. PCT/US2014/015743, dated May 20, 2014 (6 pages).

Arfsten et al., "Abrasion Resistant Coatings with Ultraviolet Absorption, via sol-gel dipping method," Mater. Res. Soc. Symp. Proc., 2005, pp. 1-9, vol. 847.

Hu et al., "Hardness and Elastic Modulus Profiles of Hybrid Coatings," Journal of Sol-Gel Science and Technology, 2005, pp. 41-46, vol. 34.

Hu et al., "Nanoscratch profiles of hybrid films based on (3-glycidoxypropyl) trimenthoxysilane and modified with tetraethoxysilane," Plastics, Rubbers and Composites, 2004, pp. 457-461, vol. 33, No. 9.

Nemeth et al., "Mechanical Properties of Hybrid Sol-Gel Derived Films as a Function of a Composition and Thermal Treatment," Thin Solid Films, Mar. 21, 2009, pp. 4888-4891, vol. 517.

First Examination Report for Australian Patent Application No. 2015207982, dated Jul. 20, 2018 (3 pages).

* cited by examiner

SCRATCH AND ABRASION RESISTANT UV BLOCKING GLASS COATING

CROSS-REFERENCE TO RELATED APPLICATION

The present application is a divisional of U.S. patent application Ser. No. 14/466,727, filed Aug. 22, 2014 and entitled "Scratch and Abrasion Resistant UV Blocking Glass Coating," which is a continuation-in-part of International PCT Application No. PCT/US2014/015743, filed Feb. 11, 2014, which is a continuation-in-part of U.S. Patent Application No. 13/779,029, filed Feb. 27, 2013, now U.S. Pat. No. 9,253,213; the entire contents of each of which is hereby incorporated by reference for all purposes.

TECHNICAL FIELD

The present invention relates to UV blocking coatings for glass that are scratch and abrasion resistant, and to methods of producing the same.

The glass coatings may be used for applications which benefit from both UV blocking and scratch resistance, such as art displays, glazing for picture frames and photographs, architectural and window glazing, opthalmic lenses, automotive glass and sunglasses.

BACKGROUND

Organic polymer coatings, such as acrylics and urethanes, can efficiently block ultraviolet ("UV") radiation. However, organic polymer coatings can be soft and scratch easily, when compared to an uncoated glass surface. On the other hand, inorganic materials, such as vacuum deposited ceramic oxide optical coatings, can be hard and scratch resistant. Inorganic materials, however, do not efficiently block UV radiation and can result in an undesirable yellow appearance in various applications, including when used to glaze artwork.

Various methods can be used for making coatings for glass that protect against UV light. See, for example, U.S. Pat. Nos. 4,495,360 and 4,122,233, which are incorporated by reference herein. The UV coatings can include a UV absorber that has compounds to absorb radiation of wavelengths starting in the near visible portion of the electromagnetic spectrum, which has a wavelength of around 400 nanometers, to the so-called vacuum ultraviolet portion of the spectrum, which can travel through a vacuum but is blocked by air and has a wavelength of around 200 nanometers in wavelength. These UV compounds can be used to protect items underlying transparent, semitransparent, and/or translucent substrates from the degradative effects of ultraviolet radiation absorption.

Various methods can be used for making abrasion-resistant coatings. See, for example, U.S. Pat. Nos. 6,649,212 and 6,001,163, which are incorporated by reference herein. Hybrid sol gel or Ormosil coatings have been developed to combine features of both the organic polymer coatings and the inorganic coatings. Such hybrid sol-gel coatings can have better scratch resistance than organic polymer coatings and more effectively block UV light when compared to inorganic coatings. U.S. Pat. No. 5,371,138 discloses a hybrid sol-gel UV blocking coating, and is incorporated by reference herein in its entirety. This patent also discloses the uses of methyltrimethoxysilane (MTMS) as an inorganic binder and glycols as a stabilizer in uncured resin. Applications for the hybrid sol-gel coatings include, but are not limited to, glass panes in paintings, art prints, and the like. Currently, for art display applications, hybrid sol-gel coatings based upon a formulation of MTMS binder using glycols are not sufficiently scratch resistant and require careful and experienced handling, especially when cutting the coating glass with a hand or wall cutter, and during assembly of an art picture frame. Therefore, further development is needed to improve the scratch and abrasion resistance for the UV blocking glass coatings so that custom picture framers and art glass fabricators can more easily handle the coated glass products.

SUMMARY

Embodiments described herein may provide scratch and abrasion resistant UV blocking glass coatings and methods for preparing the coatings.

In one embodiment, a method is provided for preparing the coatings. In one embodiment, the method includes some of the following steps: (a) preparing a first blend of aqueous colloidal silica and a solvent with a boiling point of about 230° C. or lower; (b) adding a bi-functional silanol coupling agent to the first blend to form a second blend; optionally (c) heating the second blend to a first elevated temperature such that the bi-functional silane coupling agent hydrolyzes to form a mixture of colloidal silica and a first silanol; (d) adding tetraethylorthosilicate (TEOS) to the mixture over a period of time to hydrolyze the TEOS to form a third blend of a second silanol, the first silanol, and the colloidal silica; (e) maintaining the third blend below a second elevated temperature, to avoid over-condensation of silanols; (f) adding a fourth blend to the third blend to form a fifth blend, the fourth blend including a UV absorber in the solvent; (g) casting the fifth blend onto a glass substrate; and (h) curing the fifth blend at a temperature below about 230° C. Depending upon the ratio of ingredients, step (c) may be omitted.

In some embodiments, the fourth blend can further include dyes and/or flow agents in the solvent. One suitable solvent, which has a boiling of 230° C. or lower, is 2-propoxyethanol (2-PE), also known as ethylene glycol monopropyl ether or ethylene glycol propyl ether (EGPE). Other suitable solvents are volatile mono functional alcohols (like methanol, ethanol, propanol etc.) and alpha-hydroxyl glycol ethers (like 2-propoxyl ethanol). Another suitable solvent is propylene glycol.

Any suitable bi-functional silanol coupling agent may be used. Suitable examples include glycidoxypropyltrimethoxysilane (GOPS, aka GPMS or GLYMO), or glycidoxypropyltriethoxysilane (GLEO), or isocyanatopropyltrimethoxysilane (Momentive A-1310). The UV absorber can be of the benzophenone, benzotriazole, or benzothiazole classes, such as Tinuvin 328, Tinuvin, 928, Tinuvin 1130, 2,2'-dihydroxybenzophone, and includes 2,2',4,4'-tetrahydroxybenzophenone (BP-2). The method also includes blending each of the first blend, second blend, third blend, fourth blend, and the fifth blend at temperatures between about 20° C. and about 50° C. The curing temperature is between about 150° C. and about 230° C., more preferably between about 175° C. and 200° C. The first elevated temperature is about 30° C., while the second elevated temperature is about 60° C., more preferably the first elevated temperature is about 40° C. and the second about 50° C. The period of time is about one hour.

In another embodiment, a resin is provided for making abrasion and scratch resistant UV blocking glass coating. The resin includes an inorganic polysiloxane polymer matrix formed from water-based colloidal silica ranging from about 0% to about 40% by weight, and tetraethylorthosilicate (TEOS) ranging from about 15% to about 40% by weight. The resin can also include a bi-functional silanol coupling agent coupled to the inorganic polysiloxane polymer matrix, the coupling agent ranging from about 5% to about 15% by weight. The resin can further include a UV absorber conjugated to the bi-functional silanol coupling agent, where the UV absorber ranges from about 3% to about 7% by weight. The resin also includes a solvent ranging from about 0% to about 35% by weight with a boiling point of about 230° C. or lower, where the solvent is compatible with the colloidal silica, TEOS, bi-functional silanol agent, and UV absorber.

In other embodiments, the solvent is selected from a group of high boiling point alcohols, such as glycols and glycol ethers. This includes propylene glycol, hexylene glycol, ethylene glycol, butyl cellosolve (aka ethylene glycol monobutyl ether), carbitol (aka diethylene glycol monoethyl ether), methyl carbitol (aka diethylene glycol monomethyl ether), and/or 2-propoxyethanol (2-PE, aka ethylene glycol monopropyl ether or EGPE). The UV absorber can include a benzophenone, such as 2,2',4,4'-tetrahydroxybenzophenone (BP-2). The bi-functional silane coupling agent can be glycidoxypropyltrimethoxysilane (GLYMO), glycidoxyisopropyltriethoxysilane (GLYEO), and/or Momentive A-1130 (N1-(3-trimethoxysilylpropyl)diethylenetriamine, sold as SILQUEST® A-1130 by MOMENTIVE® Performance Materials Inc. of Columbus, Ohio). The resin can include solvent-based colloidal silica ranging from about 0% to about 25% by weight, the solvent-based colloidal silica having about 20-40% SiO2 in the solvent. The resin can include solvent at about 0-30% by weight. The resin also can include water-based colloidal silica of about 0-40% by weight, the water-based colloidal silica being about 20-40% SiO2 in water. The resin further can includes TEOS of about 15-40% by weight, UV absorber of about 3-7% by weight, and the bi-functional silane coupling agent of about 5-20% by weight. The resin can also include a flowing agent of about 0-1% by weight, a red dye of about 0-0.05% by weight, and a blue dye of about 0-0.05% by weight.

In other embodiments, a method for preparing a coating composition is described herein, wherein the method includes: preparing a first blend of an aqueous colloidal silica and a water miscible solvent, the water miscible solvent selected from glycol ethers having a boiling point of less than 230° C., alkanols having 1 to 3 carbons, keto alcohols having a boiling point of less than 230° C., and combinations thereof; adding a bi-functional silanol coupling agent to the first blend to form a second blend; adding tetraethylorthosilicate (TEOS) to the second blend to form a third blend, wherein the molar ratio of TEOS to the bi-functional silanol is about 30:70 to 40:60; adding a fourth blend to the third blend to form a fifth blend, the fourth blend comprising a UV absorber and the water miscible solvent; coating the coating composition onto a glass substrate; and heating the coated substrate to a surface temperature of 150° C. to 500° C., in some embodiments 230° C. to 500° C.

Also described herein is a coating composition to coat glass, the coating composition including an aqueous colloidal silica; a bifunctional silanol coupling agent; tetraethylorthosilicate (TEOS); a UV absorber; and a water miscible solvent wherein the molar ratio of the bi-functional silanol to TEOS is about 70:30 to 60:40 and the water miscible solvent is selected from glycol ethers having a boiling point of less than 230° C., alkanols having 1 to 3 carbons, keto alcohols having a boiling point of less than 230° C., and combinations thereof. In some such embodiments, the water miscible solvent includes one or more of 2-propoxyethanol, methanol, ethanol, or diacetone alcohol. In some such embodiments, the UV absorber includes 2,2',4,4'-tetrahydroxybenzophenone. In some such embodiments, the bi-functional silane coupling agent includes a 3-glycidoxypropyltrialkoxysilane, a 3-isocyanatopropyltrialkoxysilane, or two or more thereof.

Also disclosed herein is a coated glass article comprising a cured resin composition disposed on at least a portion of a glass substrate, the cured resin composition derived by coating the coating composition onto at least a portion of a glass substrate to form a coated substrate; and heating the coated substrate to a minimum surface temperature of about 150° C. to 230° C., for example 150° C. to 500° C. or 230° C. to 500° C. to form the coated glass article. The coating composition includes an aqueous colloidal silica; a bifunctional silanol coupling agent; tetraethylorthosilicate (TEOS); a UV absorber; and a water miscible solvent wherein the molar ratio of the bi-functional silanol to TEOS is about 70:30 to 60:40 and the water miscible solvent is selected from glycol ethers having a boiling point of less than 230° C., alkanols having 1 to 3 carbons, keto alcohols having a boiling point of less than 230° C., and combinations thereof. In some such embodiments, the coating has a scratch resistance of at least 90 mN and a loss of less than about 1% UV blocking ability after immersing the coated glass in boiling water for 10 minutes. In some such embodiments, the coating has a scratch resistance of at least 100 mN and a loss of less than about 1% UV blocking ability after immersing the coated glass in boiling water for 10 minutes.

Those skilled in the art would appreciate that many other compositions and coated articles also could be used and that embodiments of the invention are not limited to the embodiments discussed herein. Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification.

DETAILED DESCRIPTION

The present disclosure may be understood by reference to the following detailed description. The present disclosure provides a hybrid inorganic-organic glass coating and method of preparing such a coating. The hybrid inorganic-organic glass coating is scratch resistant and also blocks UV radiation without adversely affecting the appearance of glazed artwork.

In one embodiment, the coating can include an inorganic polysiloxane polymer matrix made from colloidal silica and a tetraethylorthosilicate (TEOS) binder or primary monomer. The hard, inorganic TEOS matrix may be infused with a UV absorbing agent, such as a benzophenone which can conjugate to a bi-functional silanol coupling agent, for example, γ-glycidoxypropyltrimethoxysilane (or GOPS, aka GPMS, aka GLYMO). The resin formula using TEOS is compatible with other UV absorbers, and does not require bi-functional organic acids. The uncured resin can be diluted in a solvent, such as an alpha-hydroxy glycol or glycol ether, to stabilize the uncured resin. The cured coating, when cast on a glass and baked at a temperature below about 230° C., such as about 200° C., to a cured film of about 1-5 µm thick, can block at least about 97% of the UV, and more preferably at least 99% of the UV in the wavelength ranging from about 300 nm to about 380 nm. The cured coating is also resistant to scratching, for example, with a metal stylus such as a paper clip, and does not mar when rubbed with fine steel wool, for example, grade #0000. Such tests are described in ASTM C1624 (Standard Test Method for Adhesion Strength and Mechanical Failure Modes of Ceramic Coatings by Quantitative Single Point Scratch), ASTM D7027 (Standard Test Method for Evaluation of Scratch Resistance of Polymeric Coatings and Plastics Using an Instrumented Scratch Machine), ASTM D7187 (Standard Test Method for Measuring Mechanistic Aspects of Scratch/Mar Behavior of Paint Coatings by Nanoscratching), and ASTM E2546 (Standard Practice for Instrumented Indentation Testing).

Generally, the resin can include one or more of colloidal silica, TEOS, an ultraviolet-absorbing material, such as 2, 2', 4, 4' tetrahydroxybenzophenone, a bi-functional silanol coupling agent, and an alpha-hydoxy solvent with a boiling point equal to about 230° C. or lower, such as propylene glycol or 2-propoxyethanol (2-PE, aka ethylene glycol monopropyl ether, EGPE). The addition of colloidal silica to the resin or coating composition can enhance the abrasion resistance of the cured coating composition, and can also contribute to the overall stability of the coating composition. TEOS can increase the cross-linking density of the cured film. The bi-functional silanol coupling agent can couple the UV absorber to the inorganic polysiloxane polymer matrix or blend of the colloidal silica and TEOS. The resin may also include a red dye and a blue dye for correcting the color of a film formed from the resin composition. The resin may further include a flowing agent, which can decrease viscosity of the uncured resin before casting on a glass substrate. The resin may be cured at a temperature below about 230° C., or between about 175° C. and about 200° C. The coating then can be formed from the resin on the glass substrate.

The hybrid inorganic-organic coatings of the present disclosure combine the features of both organic polymer coatings and inorganic coatings. The hybrid inorganic-organic coating of the present disclosure both efficiently blocks UV radiation and is scratch resistant. The scratch and abrasion resistant coating of the present disclosure provides several benefits over the conventional coating, including that the coating is able to provide at least about 97% or higher protection from UV radiation without adversely impacting transmitted color, while still being hard and resistant to scratching. These coatings are useful for art display applications, because the art display needs to have very hard coatings so that the coatings do not scratch when placed into a metal wall cutter or assembled into a picture frame.

Process for Preparing Resin

Figure 1:
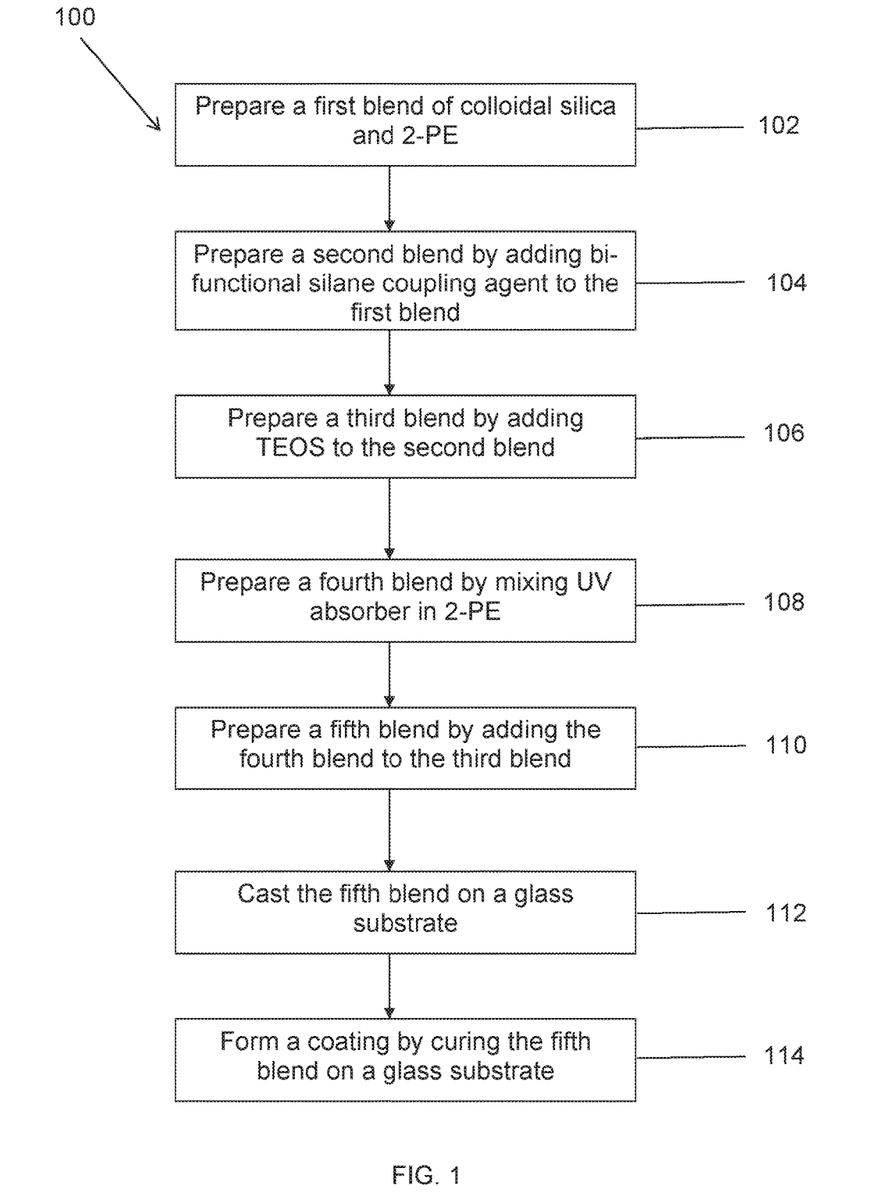
FIG. 1 is a flow chart illustrating steps for preparing resin in accordance with certain embodiments of the present disclosure.

FIG. 1 is a flow chart illustrating the steps of certain embodiments of the invention for preparing a UV blocking and scratch resistance coating. Process 100 starts with preparing a first blend of colloidal silica and 2-PE at operation 102, followed by preparing a second blend by adding bi-functional silane coupling agent to the first blend at operation 104. The method continues with preparing a third blend by adding TEOS to the second blend at operation 106, and preparing a fourth blend by adding UV absorber to 2-PE at operation 108, followed by preparing a fifth blend by mixing the third blend and the fourth blend at operation 110. Once the resin or the fifth blend is prepared, the fifth blend can be cast on a glass substrate at operation 112 and cured on the glass substrate at an elevated temperature to form the UV blocking and scratch resistance coating at operation 114. Optionally, each of dyes or flow agent may be added to form the fourth blend with 2-PE and then mixed with the third blend.

Figure 2:
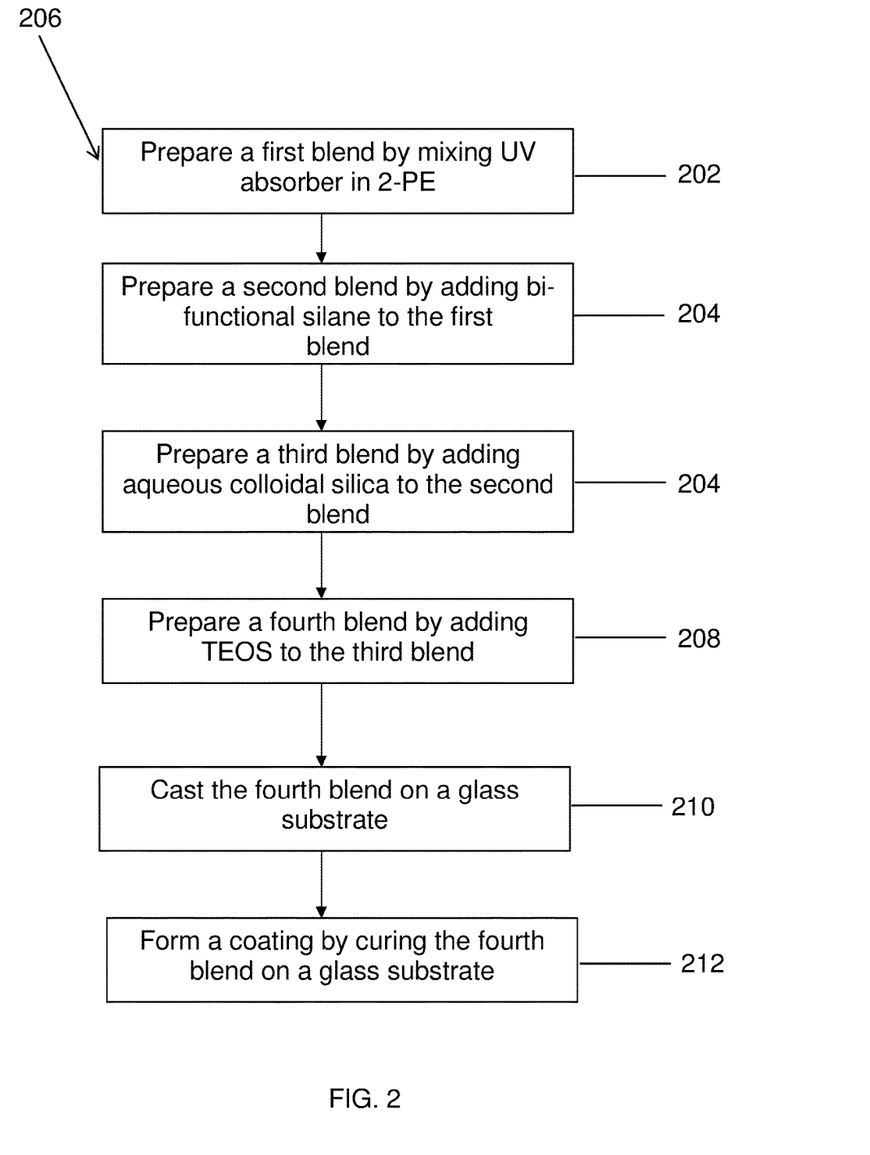
FIG. 2 is an alternative flow chart illustrating steps for preparing resin in accordance with certain embodiments of the present disclosure.

FIG. 2 is an alternative flow chart illustrating steps for preparing resin in accordance with certain embodiments of the present disclosure. Process 200 starts with preparing a first blend by mixing UV absorber in 2-PE at operation 202, followed by preparing a second blend by adding bi-functional silane coupling agent to the first blend at operation 204. The method continues with preparing a third blend by adding colloidal silica to the second blend at operation 206, and preparing a fourth blend by adding TEOS to the third blend at operation 208, followed by casting the fourth blend on a glass substrate at operation 210 and forming a coating by curing on the glass substrate at operation 212.

More specifically, the process for preparing the present resin includes the following steps: (a) Preparing a first blend aqueous colloidal silica (e.g. Nalco-1034A, available from Nalco Company of Naperville, Ill., or Nissan ST-O-40, available from Nissan Chemical America Corporation of Houston, Tex.) with 2-PE, (b) Adding to the first blend a bi-functional silane coupling agent, such as GOPS, in one aliquot to form a second blend, (c) Allowing the second blend to warm to about 40° C., while the bi-functional silanol coupling agent such as GOPS hydrolyzes to form a mixture of a colloidal silica and a first silanol, (d) Adding TEOS to the second blend slowly over a period of about 1 hour to hydrolyze the TEOS to form a mixture of the first silanol (GOPS), a second silanol (hydrolyzed TEOS), and the colloidal silica, which is a third blend, (e) Keeping the third blend below about 50° C., to avoid over-condensation of silanols, (f) Separately, mixing each of the UV absorber, dyes, and flow agent with 2-PE to form a fourth blend, the fourth blend including UV absorber, optionally dyes, and flowing agent, (g) Adding the fourth blend to the third blend of silanols and colloidal silica to form a fifth blend, (h) Casting the fifth blend (uncured) onto a glass substrate to form glass coatings, and (i) Curing the fifth blend at a temperature below about 230° C. or between about 175° C. and about 200° C.

It is known in the art that TEOS is harder to process than MTMS. One challenge in the processing of TEOS is its solubility. Conventionally, the MTMS may be more attractive for use in the hybrid inorganic-organic coating due to its better solubility. Also, it is harder to chemically bond TEOS with UV absorber, such as BP-2. The present disclosure provides solutions to improve solubility of TEOS and the bonding with the UV absorber. The present process uses an alpha-hydroxy solvent such as 2-PE or propylene glycol to improve solubility of TEOS. This solvent is compatible with each of the components in the resin, including colloidal silica, bi-functional silanol coupling agent, UV absorber, dyes, and flowing agents. Also, a bi-functional silanol coupling agent can couple the UV absorber to the TEOS, and may help improve chemical bonding of TEOS to the UV absorber.

Furthermore, a blending process may be used to provide uniform blending. The blending process may be controlled within a certain temperature range. In a particular embodiment, the blending temperature may not be too low, as higher temperature helps with better blending. Blending temperature should not be so high as to cause polymerization, which can affect viscosity and can affect scratch resistance. Blending temperatures may be between about 30° C. and about 50° C. to provide uniform blending while avoiding polymerization. During blending, some methanol and ethanol may be created by the hydrolysis reaction of TEOS and the bi-functional silanol coupling agent with water from the water-based colloidal silica, and may be lost by evaporation. The resin may be cured at a higher temperature to increase scratch resistance. In the present disclosure, curing temperatures may be controlled at about 230° C. or below. Lower curing temperatures, below about 200° C., may help reduce the loss of UV absorber BP-2, because the BP-2 is unstable at elevated temperature, and may, for example, evaporate or decompose during curing at temperatures above about 230° C. In one embodiment, the curing temperature may be between about 175° C. and about 200° C.

Colloidal silica may be water-based, for example, Nissan ST-O-40 (available from Nissan Chemical America Corporation of Houston, Tex.) containing about 40% silicon oxide ($SiO_2$) in water ($H_2O$). The water-based colloidal silica may range from 0% to about 50% by weight, or about 39% by weight, or about 25% to about 45% by weight, or about 35% to 50% by weight of the composition prior to coating and curing the resin composition. Colloidal silica may be dispersed in an organic alpha-hydroxy solvent with relative lower boiling point, such as 2-propoxyethanol, for example, Nissan NPC-ST-30 (available from Nissan Chemical America Corporation of Houston, Tex.) containing about 30% $SiO_2$ in 2-propoxyethanol may be used. The solvent based colloidal silica may range from about 0% to about 30% by weight.

For preparing the resin composition, the primary solvent may be 2-propoxyethanol (aka ethylene glycol monopropyl ether) or propylene glycol, which ranges from about 0% to about 35% by weight of the uncured resin composition, or about 5% to about 30%, or about 10% to about 25%, or about 15% to 20% by weight of the uncured resin composition. In some embodiments, the primary solvent is present at about 17.0% to 18.0% by weight. In some embodiments, the primary solvent is present at about 9% by weight of the uncoated or uncured resin composition. A secondary solvent may be used for help with the stability of the uncured resin. In some embodiments, the secondary solvent is methanol, ethanol, or diacetone alcohol, present at or less than about 20% by weight of the uncured resin composition, for example about 0.5% to 10%, or about 1% to 5% of the uncoated, uncured resin composition. In some embodiments, the secondary solvent is about 0% by weight, or is absent.

The primary silanol monomer is TEOS, or tetraethylorthosilicate. The amount of TEOS in the uncured resin composition ranges from about 10% to about 50% by weight, or about 30% to 45%, or about 35% to 40% by weight. The TEOS may be at least about 20% to 25% by weight to provide proper cross-linking density for desired combination of abrasion resistance and water resistance after coating and curing.

The bi-functional silanol coupling agent may be used for coupling the UV absorber to the inorganic polysiloxane polymer matrix or blend of the colloidal silica and TEOS. The bi-functional silanol coupling agent may be γ-glycidoxypropyltrimethoxysilane (GOPS, also called GLYMO), isocyanatopropyltrimethoxysilane (IPTMS), or IPTMS that includes some uretidinedione and/or isocyanurate functionality. The bi-functional silanol coupling agent is present in the uncured resin composition at about 5% to about 15% by weight, for example about 8% to 15% by weight, or about 10% to 15% by weight, or about 12% to 15% by weight in the uncured resin composition. In one embodiment, the bi-functional silanol coupling agent is GLYMO, present at about 11.5% by weight in the uncured resin composition. In another embodiment, the bi-functional silanol coupling agent is GLYMO, present about 13% to 14% by weight in the uncured resin composition.

The molar ratio of primary silanol monomer to bi-functional silanol coupling agent is about 30:70 to 70:30, for example about 35:65 to 60:40, or about 40:60 to 50:50, or about 30:70 to 60:40, or about 25:75 to 50:50, or about 30:70 to 40:60. The molar ratio of these two compounds is critical to impart the correct balance of scratch resistance and water resistance to the resulting coated articles.

The ultraviolet (UV) absorber may include 2,2',4,4'-tetrahydroxybenzophenone (BP-2), which ranges from about 3% to about 7% by weight of the coating composition. UV absorbers can exhibit a yellow hue or color when they are not fully dispersed. In the present disclosure, the UV absorber can react with the bi-functional silanol coupling agent, such as GLYMO. As a result, the present resin can eliminate the use of a bi-functional organic acid, such as a succinic acid or an itaconic acid, which could be used to react with the bi-functional silanol coupling agent. In embodiments, the UV absorber imparts UV blocking properties to a glass substrate on which it is coated.

The color effect of UV absorber may require correction by adding traces of dyes or tinting agents to correct the color. A first tinting agent may be added to the present resin to help correct for glass hue. The first tinting agent may include red dye. A second tinting agent may also be added to help correct for UV absorber hue. The second tinting agent may include blue dye. The effective amount of the first tinting agent may be controlled, for example, to around 0.024%, depending upon desired hue correction. The effective amount of the second tinting agent may be controlled, for example, to around 0.0063%, also depending upon desired hue correction.

The present resin may also include flow agent for viscosity control during the monomer reaction and curing stages of film preparation. Flow control or leveling agents can be higher molecular weight oligomers. Flow and leveling agent may use Dow Corning 190 fluid (also known as Xiameter 190). The flow control agents may impact the physical properties of the cured films, such as causing reduction in hardness or scratch and abrasion resistance. Therefore, the flow agent may be controlled to be at an effective amount, for example, about 0.10% by weight, which may vary with the application method.

Coating on Glass Substrate

The resin may be cast on a glass substrate to form a coated glass substrate. The coating is accomplished by techniques known to those of skill, such as roll coating, spin coating, or other casting or coating methods. The coating process, such as roll coating, may affect the quality of the film, including scratch and abrasion resistance, UV blocking, optical clarity, etc. After coating, the coated composition is cured by heating for a sufficient period of time to provide a cured composition. In embodiments, the coated substrates are heated to a surface temperature of at least about 150° C. to 230° C. to cause curing of the coating composition and drying. In some such embodiments, the coated substrates are heated to a surface temperature of about 150° C. to 500° C., or about 200° C. to 500° C., or about 230° C. to 500° C., or about 250° C. to 500° C., or about 300° C. to 500° C., or about 350° C. to 500° C., or about 300° C. to 450° C., or about 350° C. to 450° C. to provide a glass substrate having a cured composition coated thereon.

While the thickness of the cured coating is not particularly limited, we have found that a target final coating thickness of about 0.5 µm to 5 µm, for example 1 µm to 4 µm, or 2 µm to 3 µm, is sufficient to impart UV blocking capability and also provide excellent scratch resistance and water resistance of the coating—that is, durable UV blocking capability. We have found that it is advantageous to provide high solids coating compositions, in part due to the high-boiling solvents employed in the coating compositions, and in part due to the fact that the silane or silanol coupling agents are liquids prior to cure and thus contribute to a lower viscosity composition for coating. Percent solids, defined herein as all coating composition components that are not solvent, is not particularly limited as to the coating compositions. However, we have found that in embodiments coating compositions are advantageously employed having about 40 wt % to 97 wt % solids, for example about 50 wt % to 95 wt % solids, or about 60 wt % to 90 wt % solids, or about 70 wt % to 95 wt % solids, or even about 80 wt % to 95 wt % solids.

After heating, the coated glass substrates have durable UV blocking properties. As used herein, the term UV blocking means that at least 98%, for example 99%±0.5% of light having wavelengths of 300 nm to 380 nm is blocked from transmission through a coated glass article. Thus, for example, immersion of a coated glass article in boiling water for up to 10 minutes results in a loss of UV blocking ability of less than 1% of the initial amount of UV blocking of the coated glass article at the indicated wavelength. The coatings are highly abrasion/scratch resistant, wherein the normal load at which there is an adhesion failure of coating is at least about 90 mN.

The molar ratio of primary silanol monomer to bi-functional silanol coupling agent is about 30:70 to 60:40, or about 25:75 to 50:50, or about 30:70 to 40:60 to impart the correct balance of scratch resistance and water resistance to the resulting coated articles. We have found that by increasing the amount of primary silanol monomer (TEOS and various hydrolysis and partially condensed analogs thereof), increased abrasion (scratch) resistance is developed in the cured coating on glass. However, along with improvements to abrasion resistance in such embodiments the coating becomes less water resistant. Thus, when placed in boiling water, the coated glass articles having a high ratio of TEOS to bi-functional silanol coupling agent suffer significant loss of UV blocking when compared to the UV blocking ability of the coated glass articles initially. By balancing the amount of TEOS with a suitable amount of bi-functional silanol coupling agent, we have found that scratch resistance of the coating (normal load at which there is an adhesion failure of coating) of at least 90 mN is achieved, and the coated glass can be immersed in boiling water for at least 10 minutes with less than 1% loss of UV blocking properties. Further, the coated glass samples subjected to 95% relative humidity at 50° C. for at least 48 hours did not exhibit haze or delamination.

In conjunction with careful control of the molar ratio of TEOS and bi-functional silanol coupling agent in the coating compositions, we have found that the properties of the cured compositions are sensitive to the type of solvent employed in the coating compositions. More specifically, we have found that glycol ethers having a boiling point of less than about 230° C., keto alcohols having a boiling point of less than about 230° C., and alkanols having 1 to 4 carbon atoms, or 1 to 3 carbon atoms, or even 1 to 2 carbon atoms, and mixtures of these compounds provide suitably stable coating composition formation and lead to cured coatings on glass having high abrasion resistance, excellent UV blocking durability, and excellent water resistance.

Suitable glycol ethers include ethylene glycol monobutyl ether, diethylene glycol monoethyl ether, diethylene glycol monomethyl ether, and 2-propoxyethanol. Suitable keto alcohols include diacetone alcohol. Suitable alkanols include methanol, ethanol, n-propanol, and isopropanol.

EXAMPLES

The following examples are presented as illustrations of forming coatings on a glass substrate by using the methods disclosed above. As can been seen from the following examples, the coatings described herein provide better mechanical properties, such as hardness, modulus, and scratch resistance, and still substantially maintain the UV resistance as conventional coatings.

The coatings were tested according to ASTM standard tests as mentioned earlier or other standard methods for hardness, modulus, scratch resistance, and UV resistance.

The coating of the present disclosure has improved bulk film properties compared to the conventional coatings. The bulk film properties of the present coating include a Young's Modulus ($E_r$) of around 20 GPa and an indentation hardness (H) of about 1.5 GPa when indented at less than 15% of the coating thickness. The indentation hardness may be measured with a 10 µm diameter diamond berkovich indenter tip. The bulk film properties also include a brittle index of about 0.07 for the present coating (brittle index is defined as a ratio of Hardness to Modulus). The mechanical properties further include critical loads to adhesion failure at an interface of a film to a substrate. The critical loads may be determined with a 10 µm radius cono-spherical diamond tip, and were found to be over about 100 mN. The critical loads correspond to the scratch/abrasion resistance of coated films along with the other bulk film properties The mechanical properties, such as hardness, of the present invention, given their sol-gel type nature and optical functionality (UV blocking), are superior to those of cured films made from conventional alkoxy silane based precursors reported by [1] S. Nemeth, Y. C. Liu, Thin Solid Films, 517 (2009) 4888-4891; [2] L. Hu, X. Zhang, Y. Sun, R. J. J. Williams, Journal of Sol-Gel Science and Technology, 34 (2005) 41-46; and [3] L. Hu, X. Zhang, Y. Huang, Plastics, Rubbers and Composites, 33 (2004) 457-461], such as MTMS. Generally, the soda lime glass used as substrate for the coated articles reportedly has a hardness of 5.5 GPa, Young's modulus of 74 GPa, and a brittle index of around 0.075. As shown, coatings of the new invention can have a brittle index of about 0.07, a hardness of 1.5 GPa, and a Modulus of about 20 GPa. In addition, the "critical load of adhesion" is measured using a nano-scratch tester. The present coatings have critical loads ranging from 40 mN to 160 mN, normally greater than 100 mN. In contrast, the critical loads of the coatings of U.S. Pat. No. 5,371,138 have critical loads around 40 mN, much lower than the critical loads of 100 mN to 160 mN.

The effects of the molar ratio of MTMS (methyltrimethoxysilane) or TEOS (tetraethylorthosilicate) to GLYMO, order of mixing, and addition of secondary solvents are explained through the following Examples. The composition details prior to casting and curing are shown in Table 1. The results of subjecting these compositions after casting and curing to the water boil test, humidity test and scratch test are shown in Table 2. For each example, the cured film thickness was controlled through coating application parameters.

The coating compositions of the Examples were mixed and reacted as described. The compositions were then cast by glass plates via roll coating and cured by heating the plates to a minimum surface temperature of 390° C. Target final coating thickness in all cases is 2.5 μm.

Experimental Protocols

1. Coating and Curing

Plates of soda lime glass having dimensions of 28 cm×35.6 cm×0.23 cm were coated with the indicated compositions by roll coating. The nip compression was set to −50.8 μm to −76.2 μm; drive and applicator roll speeds were set to 23 m/min with a doctor roll speed of 6 m/min. Target wet film thickness of the coatings was 5-7 μm. The coated films were then passed through a conveyor oven employing two panels of Raymax 1120 IR emitters (obtained from Watlow Electric Manufacturing Company of St. Louis, Mo.) operated at 16%-20% output, resulting in final glass plate temperatures of between 390° C. and 420° C. The plates were cooled in ambient laboratory conditions prior to testing.

Thickness of cured films was measured using a surface profilometer (Dektak 150, obtained from Bruker Corporation of Billerica, Mass.). A diamond stylus tip radii of 12.5 microns with a cone angle of 45° tip geometry was used in the analyses. The coating thickness after casting and curing was 2.5±0.5 microns for all Examples.

In some cases, the glass plates were divided after coating in order to carry out one or more subsequent test protocols.

2. Scratch Resistance

Scratch resistance, or critical load was measured using a nano-scratch tester NST from Anton Paar TriTec SA of Peseux, Switzerland for interfacial property of the coating in contact with glass. Critical load (mN) is defined as the normal load at which there is an adhesion failure of coating. A sphero-conical diamond tip of 10 micron radii with a cone angle of 90° tip geometry was used. The sum total of sample and measurement standard deviation was less than 10% of reported critical load values.

3. Water Boil Test

Boil testing was carried out by immersing 10 cm×10 cm coated and cured glass samples in water at 100° C. for 10 mins. This test was performed as a measure of adhesion of coating on glass. UV blocking ability, that is, percent transmission of light having wavelengths of 300 nm-380 nm) was measured using a Lambda 750 UV/Vis Spectrometer (obtained from PerkinElmer Inc. of Waltham, Mass.) before and after the boiling to check for loss of UV blocking. The initial UV blocking value for all samples was 99%±0.5%, that is, transmission of UV radiation was 1%±0.5%. More than 1% loss of UV blocking value based on the initial reading resulted in a test rating of "fail." Percent removal is determined as:

$$\% \ UV \text{ blockage lost in water boil test} = \frac{(Before - After)}{Before} \times 100$$

4. Humidity Test

Humidity resistance was tested by subjecting a 10 cm×10 cm coated glass sample at 50° C./95% relative humidity for 48 hr, according to U.S. Military Specification MIL-C-48497A, para. 4.5.3.2. This test was performed as a measure of environmental exposure of the cured coating. Samples were rated pass/fail based on the extent of haziness or delamination. When placed on a black background, any observation of haze or delamination resulted in a test rating of "fail."

Examples 1-4

Coating compositions of Examples 1-4 were prepared according to order of mixing as shown in FIG. 1, further as described in the section above entitled "Process for Preparing Resin", as it relates to FIG. 1. Compositional details are shown in Table 1.

The effect of Primary Silane:GLYMO molar ratio and order of mixing on water boil test, humidity test and scratch test are shown in Table 2.

Examples 5-7

Coating composition for Examples 5-7 were prepared according to order of mixing as shown in FIG. 2, further as described in the section above entitled "Process for Preparing Resin", as it relates to FIG. 2. Compositional details are shown in Table 1.

The effect of Primary Silane:GLYMO molar ratio and order of mixing on water boil test, humidity test and scratch test are shown in Table 2.

TABLE 1

Resin coating compostion of Examples 1-7. The UV absober is 2,2',4,4'-tetrahydroxybenxophenone in all Examples.

| Example | 1 | 2 | 3 | 4 | 5 | 6 | 7 |
|---|---|---|---|---|---|---|---|
| Primary Silane | MTMS | TEOS | TEOS | TEOS | TEOS | TEOS | TEOS |
| Primary Silane mass (g) | 111 | 410 | 300 | 250 | 250 | 219 | 188 |
| GLYMO mass (g) | 114 | 88 | 133 | 153 | 153 | 165 | 178 |
| Silane:GLYMO % molar ratio | 40:60 | 65:35 | 50:50 | 40:60 | 40:60 | 35:65 | 30:70 |
| 37% HCl mass (g) | 1 | 1 | 1 | 1 | 2 | 2 | 2 |
| Colloidal silica | NPC-ST-30 and N1034A | Nissan ST-O-40 and MA-ST | Nissan ST-O-40 | Nissan ST-O-40 | Nissan ST-O-40 | Nissan ST-O-40 | Nissan ST-O-40 |
| Colloidal silica mass (g) | 423 | 492 | 450 | 450 | 450 | 450 | 450 |
| UV absorber mass (g) | 51 | 70 | 70 | 64 | 64 | 64 | 64 |
| Primary solvent | Hexylene glycol | 2-PE | 2-PE | 2-PE | 2-PE | 2-PE | 2-PE |

TABLE 1-continued

Resin coating compostion of Examples 1-7. The UV absober is 2,2',4,4'-tetrahydroxybenxophenone in all Examples.

| Example | 1 | 2 | 3 | 4 | 5 | 6 | 7 |
|---|---|---|---|---|---|---|---|
| Primary solvent mass (g) | 195 | 100 | 100 | 100 | 136 | 136 | 136 |
| Secondary solvent | Propylene glycol | 2-PE | 2-PE | 2-PE | 2-PE | 2-PE | 2-PE |
| Secondary solvent mass (g) | 82 | 100 | 100 | 100 | 64 | 64 | 64 |
| Total mass (g) | 977 | 1261 | 1154 | 1118 | 1119 | 1100 | 1082 |

TABLE 2

Effect of Primary Silane:GLYMO ratio and order of mixing

| Examples | Silane (%) | Coupling agent (%) | Order of mixing | Water boil test (Pass/Fail) | Humidity test (Pass/Fail) | Scratch resistance (mN) |
|---|---|---|---|---|---|---|
| 1 | MTMS (40) | GLYMO (60) | FIG. 1 | Pass | Pass | 40 |
| 2 | TEOS (65) | GLYMO (35) | FIG. 1 | Fail | Fail | 150 |
| 3 | TEOS (50) | GLYMO (50) | FIG. 1 | Fail | Fail | 100 |
| 4 | TEOS (40) | GLYMO (60) | FIG. 1 | Pass | Pass | 115 |
| 5 | TEOS (40) | GLYMO (60) | FIG. 2 | Pass | Pass | 110 |
| 6 | TEOS (35) | GLYMO (65) | FIG. 2 | Pass | Pass | 105 |
| 7 | TEOS (30) | GLYMO (70) | FIG. 2 | Pass | Pass | 80 |

Example 8

The effects of additional secondary solvents on scratch test results are shown in Table 3. The amount of secondary solvents ranges from 5% to 10% of total mass of the coating composition for all examples shown in Table 1.

In each case, the indicated secondary solvent was added to the coating composition indicated by the Example No. from Table 1, then the coating composition was coated and cured as in all previous Examples.

TABLE 3

Effect of additional secondary solvents on scratch resistance.

| Example No. from Table 1 | Primary Silane (%) | Coupling agent (%) | Additional Secondary Solvent (% mass of total coating composition) | Scratch resistance (mN) |
|---|---|---|---|---|
| 1 | MTMS (40) | GLYMO (60) | Propylene glycol (1%) | 40 |
| 5 | TEOS (40) | GLYMO (60) | 2-Propoxy ethanol (1.6%) | 110 |
| 3 | TEOS (50) | GLYMO (50) | Methanol (1%) | 110 |
| 3 | TEOS (50) | GLYMO (50) | n-Butanol (1%) | 87 |
| 3 | TEOS (50) | GLYMO (50) | Hexylene glycol (1.6%) | 57 |
| 3 | TEOS (50) | GLYMO (50) | Diacetone alcohol (1.6%) | 95 |
| 3 | TEOS (50) | GLYMO (50) | Propylene glycol (1.6%) | 82 |
| 3 | TEOS (50) | GLYMO (50) | Ethylene glycol (1.6%) | 88 |
| 3 | TEOS (50) | GLYMO (50) | Hexylene glycol (1.6) | 64 |

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document. Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A coating composition comprising:
   an aqueous colloidal silica;
   a bifunctional silanol coupling agent;
   tetraethylorthosilicate (TEOS);
   a UV absorber; and
   a water miscible solvent;
   wherein the coating composition is substantially free of organic acids; and
   wherein the molar ratio of the bifunctional silanol coupling agent to TEOS is about 70:30 to 60:40 and the water miscible solvent is selected from glycol ethers having a boiling point of less than 230° C., alkanols having 1 to 3 carbons, keto alcohols having a boiling point of less than 230° C., and combinations thereof.

2. The composition of claim 1 wherein the water miscible solvent comprises one or more of 2-propoxyethanol, methanol, ethanol, or diacetone alcohol.

3. The composition of claim 1 wherein the UV absorber comprises 2,2',4,4'-tetrahydroxybenzophenone.

4. The composition of claim 1 wherein the bifunctional silanol coupling agent comprises a 3-glycidoxypropyltrialkoxysilane, a 3-isocyanatopropyltrialkoxysilane, or two or more thereof.

5. The composition of claim 1 further comprising a dye, a flow agent, or both.

6. A coated glass article comprising a cured resin composition disposed on at least a portion of a glass substrate, the cured resin composition derived by:
   coating the coating composition of claim 1 onto at least a portion of a surface of a glass substrate to form a coated substrate; and
   heating the coated substrate to a surface temperature of about 230° C. to 500° C. to form the coated glass article.

7. The coated glass article of claim 6 wherein the coating has a scratch resistance of at least 90 mN and a loss of less than about 1% UV blocking ability after immersing the coated glass in boiling water for 10 minutes.

8. The coated glass article of claim 6 wherein the coating has a scratch resistance of at least 100 mN and a loss of less than about 1% UV blocking ability after immersing the coated glass in boiling water for 10 minutes.

9. The composition of claim 1 wherein the bifunctional silanol coupling agent comprises a 3-isocyanatopropyltrialkoxysilane.

10. A coating composition comprising:
   an aqueous colloidal silica;
   a bifunctional silanol coupling agent;
   tetraethylorthosilicate (TEOS);
   a UV absorber; and
   a water miscible solvent;
   wherein the coating composition is substantially free of organic acids linking the UV absorber to the TEOS.

* * * * *

UNITED STATES PATENT AND TRADEMARK OFFICE
CERTIFICATE OF CORRECTION

PATENT NO. : 10,266,707 B2
APPLICATION NO. : 15/227461
DATED : April 23, 2019
INVENTOR(S) : Philip William Sherwood et al.

Page 1 of 1

It is certified that error appears in the above-identified patent and that said Letters Patent is hereby corrected as shown below:

On the Title Page

Item [57], Line 3; delete "silica." replace with -- silica, --

In the Specification

| Column | Line | Delete | Insert |
|---|---|---|---|
| 3 | 29 | "SiO2" | -- $SiO_2$ -- |
| 3 | 33 | "SiO2" | -- $SiO_2$ -- |
| 12 | 49 | "compostion" | -- composition -- |
| 12 | 49 | "absober" | -- absorber -- |
| 12 | 50 | "tetrahydroxybenxophenone" | -- tetrahydroxybenzophenone -- |
| 13 | 3 | "compostion" | -- composition -- |
| 13 | 3 | "absober" | -- absorber -- |
| 13 | 4 | "tetrahydroxybenxophenone" | -- tetrahydroxybenzophenone -- |

Signed and Sealed this
Third Day of December, 2019

Andrei Iancu
*Director of the United States Patent and Trademark Office*